Dec. 5, 1944.　　　M. W. DITTO ET AL　　　2,364,060
METHOD OF VITAMINIZING FERMENTED BEVERAGES
Filed May 7, 1941　　　2 Sheets-Sheet 1

Inventors
M. W. Ditto,
W. P. Torrington,
By Seymour, Bright & Nottingham
Attorneys

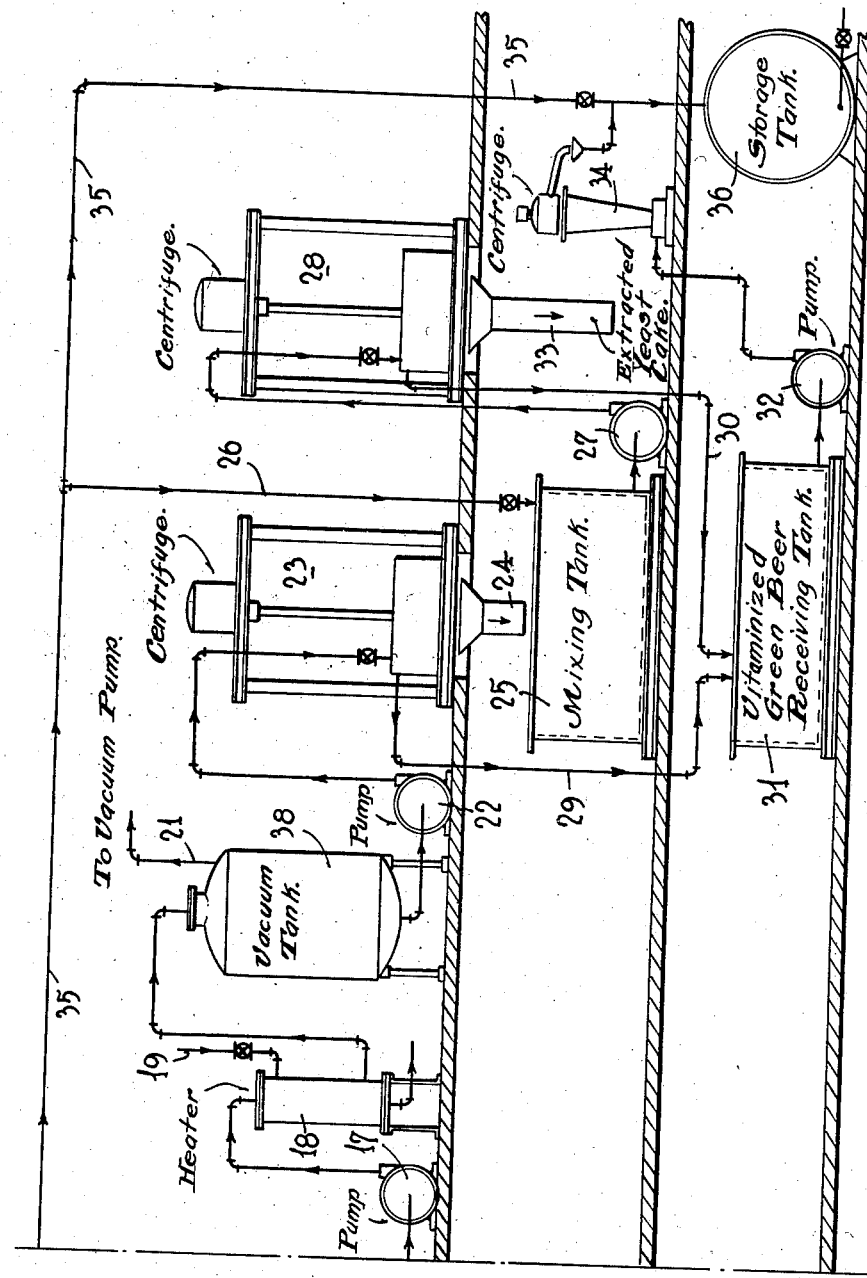

Patented Dec. 5, 1944

2,364,060

UNITED STATES PATENT OFFICE 2,364,060

METHOD OF VITAMINIZING FERMENTED BEVERAGES

Marvin W. Ditto and William P. Torrington, New York, N. Y., assignors to Emulsions Process Corporation, New York, N. Y., a corporation of Delaware Application May 7, 1941, Serial No. 392,360

9 Claims. (Cl. 99—11)

This invention relates to the manufacture of fermented malt beverages, such as beer, and the primary object of the invention is to produce vitaminized beer or the like during the conventional manufacture of malt beverages.

It is recognized that the present-day tendency toward the refining of foods has resulted in a situation where the average foods that are highly refined are seriously lacking in many of the necessary physiologically active compounds known as vitamins. A good illustration of this is that occurring in the milling industry where the so-called white flours contain only approximately one tenth of the thiamin normally contained in whole wheat flour. This condition, along with the fact the majority of foods prepared by boiling in water, also results in significant losses of these various water-soluble vitamins, has produced a situation where the average American diet is a borderline diet, as far as most vitamins are concerned, and particularly in regard to those comprising the water-soluble B complex group.

This condition has been recognized by the British Government which recently passed legislation requiring that all white flour have added to it a predetermined amount of thiamin or B–1. There is at the present time in the United States pending proposals for addition of these various vitamins to the white flour in this country. This same condition is also present in the case of fermented beverages such as whiskey, beer and wine. In all of these beverages there is present a substantial calory value with little or no vitamins. In the case of distilled liquors it can readily be seen how the distillation would eliminate any physiological active salts; in the case of beer and wine, the source material from which they are made contain rather large amounts of these various vitamins of the B group. These are removed during fermentation by the yeast cells which store these vitamins within the cellular structure of the cells, and are used by these cells in their metabolic processes. Therefore, in the beers and wines manufactured today and clarified by bright filtration which frees them of yeast cells, there is present little or no vitamins of the B complex group.

It is now recognized that these refined foods should be reinforced with those vitamins that have been removed in processing, or if possible the processing should be changed so that they will not be destroyed and can be secured in the final product in an unaltered form. Therefore, in the brewing industry there is a rational reason for the treatment of the residue yeast that is now being discarded, so as to secure from this yeast the vitamins that have been abstracted from the original material by the yeast during fermentation, for re-incorporation into the beer.

While it has been proposed to add synthetic vitamins to the finished beer, this is not as satisfactory as the addition of the natural vitamins obtained from the yeast. In the first place, of the total B complex group comprising an unknown number of factors, there has been at the present time, only five of these vitamins synthesized; therefore the total complex could not be secured from a synthetic source.

In the second place, the use of synthetic vitamins could not compare in price to the vitamins that could be secured from the residue yeast, which is now a waste product as far as the brewing industry is concerned.

In view of the fact these water-soluble B complex vitamins are present within these yeast cells, these cells must be effectively opened or otherwise altered so that the intracellular material can be recovered in a substantially unaltered condition. Before this is done it is necessary that the residue yeast be in some measure separated from the other inert material present, such as hop leaves, hop seeds, and other impurities that would cause turbidity or off-taste in the final product.

Another object of the present invention is to furnish a procedure by which the B complex vitamins from the residue yeast cells may be imparted to green beer on its way to the storage tank or tanks in a brewery.

With the foregoing and other objects in view which will appear as the description proceeds, the invention consists of the novel process hereinafter discussed in detail in connection with the accompanying drawings, in which:

Fig. 1a is a similar view of the remaining portion of the apparatus.

Figure 1:
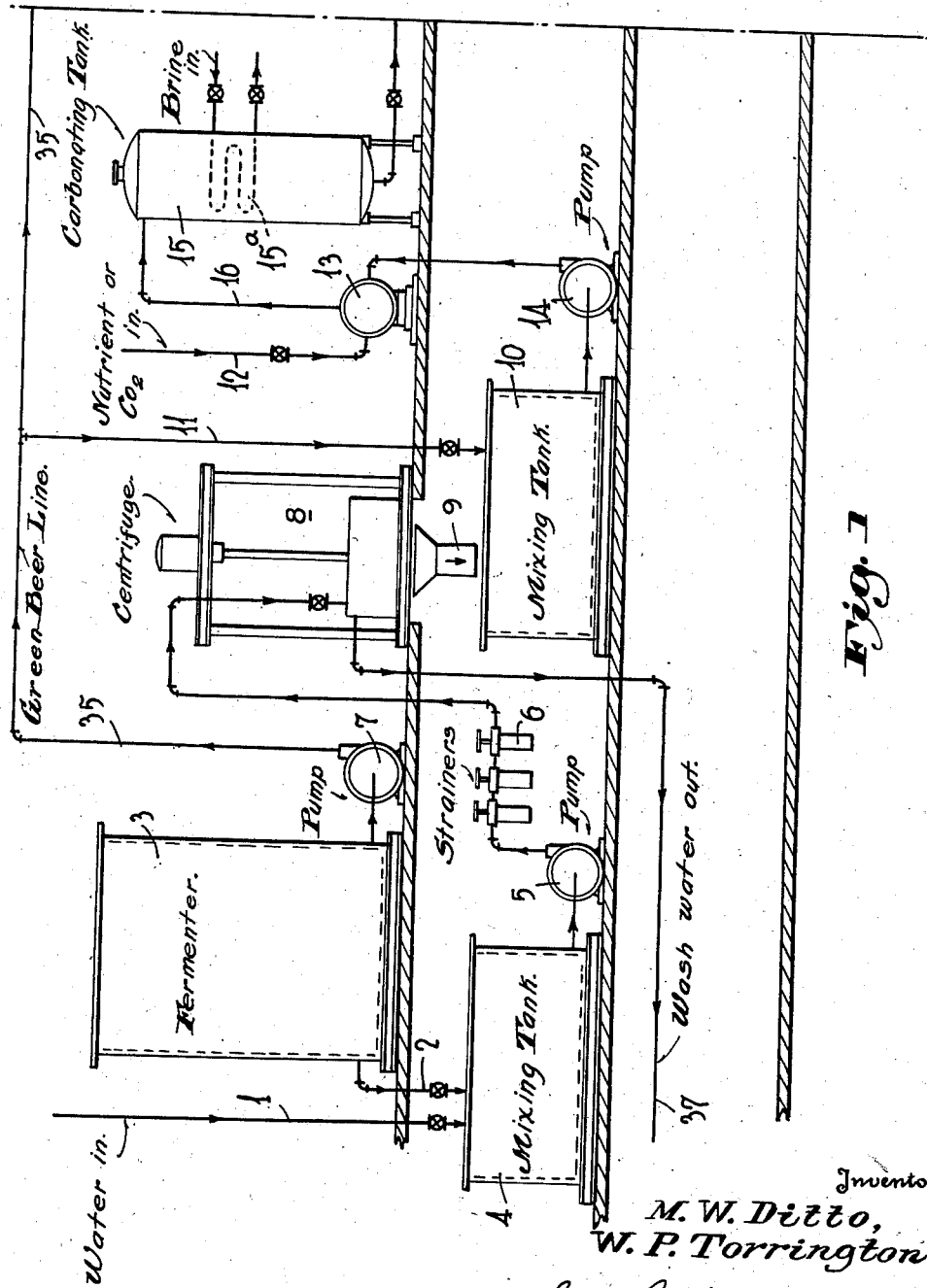
Fig. 1 is a diagrammatic side elevation of the first portion of the apparatus up to and including the carbonating tank.

Referring to Fig. 1 of the drawings, 3 is a conventional open or closed fermenter used in the brewing of beer. After fermentation of the beer wort is completed, the yeast settles to the bottom of the fermenting tank and is discharged by a line 2 into a mixing tank 4 (according to our process), where it is agitated with an equal weight of water (preferably at room temperature) introduced through pipe 1. After the residue yeast and water have been uniformly mixed in the tank 4, the mixture is forced by a pump 5 through a series of strainers 6 which remove the inert solids, the filtered yeast slurry is then passed from the strainers to a centrifuge 8 in which it is freed of water before being discharged through a chute 9 into a second mixing tank 10. The material passing through the chute is in the form of a heavy cake containing approximately 20% water. The wash water from the centrifuge is discharged through a line 37 leading to any suitable point of use or disposal.

In the tank 10, the washed yeast cake is mixed with an equal weight of green beer forced from the fermenter by a pump 7 through line 35 and 11. In tank 10 the green beer and yeast cake are thoroughly agitated and mixed before being forced into a dispersion mill 13 by pump 14 at a pressure of approximately 100 pounds per square inch. The mill 13 is preferably of the type disclosed in the M. W. Ditto Patent 2,169,339, dated August 15, 1939, as such a mill is capable of subjecting materials to violent turbulence, impact and shear, and therefore finely disperses the ingredients within one another.

Nutrient or $CO_2$ in sufficient amount to effect carbonation of the mixture is introduced into the mill through line 12, simultaneously with the yeast slurry. After the nutrient or $CO_2$ is thoroughly mixed with the yeast slurry, the mixture is discharged through line 16 at a pressure of approximately 100 pounds per square inch into a soaking or carbonating tank 15 capable of maintaining the mixture under pressure. Such tank should be of sufficient size so that the mixture may be detained therein for an effective time period to effect thorough carbonation of the yeast slurry at the temperature and pressure existing in the tank. The desirable temperature is in the neighborhood of 32° F. and is below 40° F. Such temperature may be maintained by passing brine or some other suitable cooling agent through a coil 15a positioned in the tank 15.

When the yeast slurry has been thoroughly carbonated, it is withdrawn from the tank by means of a pump 17 (Fig. 1a) which increases the pressure on the carbonated yeast slurry to a relatively high superatmospheric pressure, for example, between 1000 and 3000 pounds per square inch. After the pressure is increased, the temperature of the carbonated yeast slurry is raised to approximately 125° F. in a tubular heater 18 which may be heated by steam conducted through the line 19. After the carbonated yeast slurry has been heated, it is discharged from the region of high pressure and temperature into a vacuum chamber 38, in which is carried a vacuum of approximately 27" referred to 30" barometer. The vacuum is maintained by a suitable pump (not shown) connected to the pipe 21.

When the carbonated yeast slurry is discharged into tank 38, the $CO_2$ and some water vapor are released and pass off through pipe 21 and this sudden release of pressure functions to alter or rupture the walls of the yeast cells so that the enzymes and other intracellular material contained within the cells are released into the slurry. The treated slurry is continuously removed from the bottom of the vacuum tank by a pump 22 which forces the same into a centrifuge where the supernatant liquid or vitaminized green beer is separated from the cellular debris; the supernatant liquid being conducted through line 29 into a receiving tank 31. The residue yeast cake is periodically discharged from the centrifuge through a chute 24 into a third mixing tank 25 where it is mixed with another portion of the green beer from the fermenter, conducted to the tank through pipes 35 and 36. The green beer added in 25 will be equal to approximately three times the weight of the residue cake. After thoroughly agitating the residue cake and the fresh green beer in tank 25, the secondary mixture is forced by a pump 27 into another centrifuge 28 where the mixture is again separated into a supernatant liquid and extracted cake; the supernatant liquid being passed from the centrifuge to the tank 31 through pipe 30 and the extracted yeast cake being discharged through chute 33. The extracted cake can be disposed of or can be dried and used as a supplement to cattle or stock food.

The vitaminized green beer which is commingled in the tank 31 is passed from such tank by a pump 32 through a centrifuge 34 which functions as a filter or clarifier, and from the centrifuge the green beer is passed into the line 35. It combines with the remainder of the green beer resulting from the original fermentation before such green beer enters the storage tank 36.

After the desired aging period, the treated beer is then removed from tank 36 and subjected to the customary filtration and finishing treatment which has no effect on the water soluble vitamins with which the beer is fortified.

Some of the procedure outlined herein has been heretofore disclosed in Patents 2,190,689 and 2,223,501, granted to W. P. Torrington. These patents disclose simple and practical methods whereby yeast cells can be effectively treated to release the intracellular compounds contained in the cells. We propose to incorporate some of the steps set forth in these patents so that the vitamins contained in the residue yeast can be returned to the fermented beer without the necessity of any complicated processing, such as concentration or chemical treatment. In other words, we will employ certain features of such patented methods to treat the residue yeast as well as a portion or portions of the green beer whereby the latter will act as an extracting agent in the removal of the vitamins from the residue yeast. The yeast extract resulting from this treatment will be in its natural form as present in the yeast cells and will not have any off odor or taste due to changes such as will occur during other commonly used methods of extraction such as autolysis, chemical treatment, or heating the yeast above the temperature of coagulation.

By way of further explanation we give the following example.

In the brewing of beer the usual practice is to pitch 1 lb. of yeast from a previous fermentation to each 31 gallon barrel of wort. This yeast is in the form of a heavy slurry containing approximately 10 to 12% yeast computed on dry weight basis. After fermentation is completed, the resulting yeast crop increases to 3 to 4 pounds of this 12% slurry. One pound of this yeast crop is required for pitching the succeeding fermentation, so there is available per barrel of beer approximately 3 pounds of yeast slurry or $\frac{3}{10}$ lb. per barrel of beer of yeast by dry weight. This residue contains beside yeast, other impurities such as hop seeds, leaves, and protein matter which must be removed before this yeast is processed or the resulting product would contain the bitter principles extracted from the hop seeds such as hop resins and other impurities which would tend to create turbidity and off taste. To remove the inert material, this 3 lbs. of yeast slurry per barrel of beer (according to our process) is mixed with 3 lbs. of cold water and is then passed through a series of strainers whose screen size progressively decreases, thereby freeing the yeast suspension from all particles above .004". This strained yeast suspension is freed of excess water in a basket-type centrifuge to a cake containing approximately 20% yeast on a dry basis, or 1½ lbs. of cake per barrel of beer. This yeast cake can be further washed and debittered if considered necessary, this being dependent upon the character of the yeast and the methods under which it was grown. This 20% yeast cake, or that resulting from further washing, is then diluted with an equal weight of green beer secured from the same fermenter from which the yeast crop was removed. This results in 3 lbs. of a 10% yeast slurry which is then processed according to either of the above-mentioned Torrington patent methods. Specifically, in one method, this 10% yeast slurry is carbonated at 100 pounds per square inch with $CO_2$ at a low temperature, slightly above 0° C. When thoroughly carbonated, this slurry is subjected to an increase in pressure and a temperature of approximately 125° F. From this temperature and pressure, it is sprayed into a vacuum chamber, where the release of the $CO_2$ and water vapor causes effective cellular wall alteration. This treated yeast slurry is then separated in a basket-type centrifuge into a supernatant liquid free of cell walls, and these are formed into a residue cake containing the cellular debris. This residue cake contains a considerable amount of intracellular vitamin material that is mechanically retained in the cake. It therefore is washed with approximately three times its weight of green beer and separated in a centrifuge for the second time. The supernatant liquid from this second separation is then added to that from the first separation and may be added directly to the beer resulting from the same fermentation or it may be given an intermediate treatment such as filtration, centrifugal clarification, or other means to free it from suspended material. Following this procedure, there is obtained more than 80% of the total B complex present along with approximately 18% of the intracellular yeast solids representing about .054 pound of solids per barrel of beer.

Thus it can be seen that by a simple procedure which does not employ any destructive chemicals or heat, the water-soluble B complex can be effectively extracted from the residue yeast obtained during fermentation of the beer, so that the final beer will contain above 80% of the original vitamins present in the material from which the original extract was made. The amount of liquid handled per barrel of beer is very small, amounting to approximately 3 lbs. of residue yeast and 5 lbs. of green beer, making a total of 8 lbs. of total liquid handled per 31 gallon barrel of beer of which 5.5 lbs. are added to the finished beer and 1.5 is the residue yeast cake containing approximately 20% solids. This residue yeast cake after extraction can be dried and sold as a cattle food supplement.

Tests have shown that brewers yeast has a B-1 potency that ranges from 20 to 60 I. U. per gram and a B-2 of 20 to 40 gramma per gram. Assuming that the residue yeast has a vitamin potency of 50 I. U. of B-1 per gram, and that there is a .3 of a pound of dry yeast available per barrel of beer, the amount of vitamin B-1 added per pint of beer would be as follows:

B-1 available per 31 gallon barrel from residue yeast @ 50 I. U./gm.—

$.3 \times 454 \times 50 = 6810$ International units

B-1 available per 31 gallon barrel @ 80% recovery—

$.8 \times 6810 = 5448$ International units

B-1 per pint of finished beverage—

$\frac{5448}{248} = 21.9$ International units

In our efforts to eliminate disadvantages found in the disclosures of the prior art, we have kept certain items in mind; first, to eliminate any factors which would change the taste or flavor of the beer; and second, to eliminate any factors which, due to heat or chemical reaction, would change the characteristics of the vitamin products themselves. In doing this we have conceived a process which may be directly incorporated with the brewing of beer as practiced in ordinary brewing plants. In the preferred procedure, a part of the beer during the brewing process is diverted from its normal flow and mixed with the surplus yeast produced in the brewing process, and then the yeast cells in the mixture are broken down and the intracellular material containing the vitamins extracted by using the diverted beer as an extracting agent before the diverted beer thus fortified is re-introduced into the main batch of beer undergoing processing. It will therefore be understood that in the brewing practice for the vitaminization of beer we are treating the surplus yeast in the presence of beer diverted from the system and after the diverted beer is vitaminized, it is returned to the system.

In conclusion, we may say that it is not absolutely necessary to carbonate the mixture in tank 15 if the green beer used has a small percentage of unconverted nutrient therein. In such a case, it is possible to activate the yeast cells without the necessity of using an outside source of $CO_2$.

Where nutrients are added, it will be understood that it may be any compound or group of compounds capable of feeding the yeast cells. A balanced nutrient usually consists of a source of sugar and a number of inorganic chemicals. Specifically, for our purpose, we generally use dextrose and do not bother about having a balanced nutrient although it could be used, as we are mainly interested in securing a formation of $CO_2$ in tank 15, and there is usually enough reserve mineral matter in the yeast itself to take care of the short activation period. The time period necessary is to some extent dependent upon the temperature and would vary from approximately 20 minutes at 50° F. to three hours at 32° F. If $CO_2$ is added in the tank 15, we can secure satisfactory results with a detention period of sufficient length to secure a complete saturation with $CO_2$, at the operating temperature and pressure. When a mill of the type mentioned above is used for dispersion, this period is very short and it is our belief that we will be able to operate continuously by dispersing $CO_2$ in the yeast slurry at a low temperature by means of the dispersion mill before conducting the mixture to the atomizing pump with a time period of only a very few minutes. This can be accomplished by using a continuous conduit of proper length instead of the soaking or detention tank 15.

It will be apparent to those skilled in the art that aged beer could be used in the tanks 10 and 25 just as effectively as green beer, but in our preferred method of operation we would use the green beer in a step of brewing. Of course, green beer from another batch could be used in tanks 10 and 25. Our primary reason for indicating that the green beer from the same batch is used with the residue yeast is to maintain a balance, so that all the vitamins removed by fermentation from one batch will be treated by green beer from that batch and added to the same beer from which the yeast is secured. Manifestly, this is not absolutely essential as a control could be set up by using yeast from any source and beer either green or furnished from any other source.

There is a distinct benefit to be secured in the manufacture of malt beverages in addition to the extraction of the vitamin complexes, by the addition to the beverage of the protolytic enzymes present in the yeast extract.

When vitaminizing a fermented beverage such as wine or beer by our process, it is desirable that the amount of beverage that is diverted for processing be returned to the bulk of the beverage unchanged, that is, the alcohol content and percentage of water should not be in any way varied by the treatment. Therefore, we suggest a slight modification of the processing outlined as follows:

In the disclosed system, when the carbonated yeast slurry containing the percentage of alcohol present in the beverage from which the slurry is composed is atomized in tank 38, the vacuum pump exhausting the vapor out of line 21 would remove a portion of the alcohol and water that would be flashed into vapor as a result of the differential temperature and pressure. This would change the original concentration of alcohol if it were not returned to vacuum tank 38. Therefore, we propose that a reflux condenser (not shown) be used in line 21 so that any water or alcohol vapor removed by the vacuum pump would be condensed and returned to tank 38, only the uncondensable gas being removed.

While we have disclosed what we now consider to be a preferred method of procedure, we are aware that changes may be made in the details disclosed without departing from the spirit of the invention as expressed in the claims.

What we claim and desire to secure by Letters Patent is:

1. In a method of producing a fermented malt beverage, separating green fermented beverage from residue yeast, removing from said residue yeast, hop seeds, leaves, and other impurities which would tend to create turbidity and off taste in the finished beverage, mixing the thus purified yeast with a portion of the green beverage, substantially completely saturating such mixture with $CO_2$, heating the carbonated mixture and subjecting it to high $CO_2$ pressure, then suddenly releasing the pressure and thereby causing the yeast cells to be ruptured, separating the $CO_2$ and water vapor from the liquid mass, separating a liquid fraction from the remainder of the liquid mass, and commingling said liquid fraction with a fermented malt beverage.

2. In a method of producing a fermented malt beverage, separating green fermented beverage from residue yeast, removing from said residue yeast, hop seeds, leaves, and other impurities which would tend to create turbidity and off taste in the finished beverage, mixing the thus purified yeast with a portion of the green beverage, substantially completely saturating such mixture with $CO_2$, heating the carbonated mixture and subjecting it to high $CO_2$ pressure, then suddenly releasing the pressure and thereby causing the yeast cells to be ruptured, separating the $CO_2$ and water vapor from the liquid mass, fractionating said liquid mass into a first liquid fraction and a substantially solid fraction, mixing said solid fraction with a larger portion of the green beverage and thereby making a second mixture, mechanically separating a second liquid fraction from said substantially solid fraction, commingling said first and second liquid fractions with the remaining portion of the green beverage, and then aging.

3. In a method of producing a fermented malt beverage, separating green fermented beverage from residue yeast, removing from said residue yeast, hop seeds, leaves, and other impurities which would tend to create turbidity and off taste in the finished beverage, mixing the thus purified yeast with a portion of the green beverage approximately equal in weight to the purified yeast, substantially completely saturating such mixture with $CO_2$, heating the carbonated mixture and subjecting it to high $CO_2$ pressure, then suddenly releasing the pressure and thereby causing the yeast cells to be ruptured, separating the $CO_2$ and water vapor from the liquid mass, separating a liquid fraction from the remainder of the liquid mass, and commingling said fraction with a fermented malt beverage.

4. In a method of producing a fermented malt beverage, separating green fermented beverage from residue yeast, removing from said residue yeast, hop seeds, leaves, and other impurities which would tend to create turbidity and off taste in the finished beverage, mixing the thus purified yeast with a portion of the green beverage, substantially completely saturating such mixture with $CO_2$, heating the carbonated mixture to approximately 120° F. and subjecting the heated mixture to high $CO_2$ pressure, then suddenly releasing the pressure and thereby causing the yeast cells to be ruptured, separating the $CO_2$ and water vapor from the liquid mass, separating a liquid fraction from the remainder of the liquid mass, and commingling said liquid fraction with another portion of the green beverage.

5. In a method of producing a fermented malt beverage, separating green fermented beverage from residue yeast, removing from said residue yeast, hop seeds, leaves, and other impurities which would tend to create turbidity and off taste in the finished beverage, mixing the thus purified yeast with a portion of the green beverage, substantially completely saturating such mixture with $CO_2$ at a pressure of 100 pounds per square inch and a temperature slightly above 32° F., heating the carbonated mixture and subjecting it to high $CO_2$ pressure, then suddenly releasing the pressure and thereby causing the yeast cells to be ruptured, separating $CO_2$ and water vapor from the liquid mass, separating a liquid fraction from the remainder of the liquid mass, and commingling said liquid fraction with another portion of the green beverage.

6. In a method of producing a fermented malt beverage, separating green fermented beverage from residue yeast, removing from said residue yeast, hop seeds, leaves, and other impurities which would tend to create turbidity and off taste in the finished beverage, mixing the thus purified yeast with a portion of the green beverage, substantially completely saturating such mixture with $CO_2$, heating the carbonated mixture and subjecting it to high $CO_2$ pressure between 1,000 and 3,000 pounds per square inch, then suddenly releasing the pressure and thereby causing the yeast cells to be ruptured, separating the $CO_2$ and water vapor from the liquid mass, separating a liquid fraction from the remainder of the liquid mass, and commingling said liquid fraction with another portion of the green beverage.

7. In a method of producing a fermented malt beverage, separating green fermented beverage from residue yeast, removing from said residue yeast, hop seeds, leaves, and other impurities which would tend to create turbidity and off taste in the finished beverage, mixing the thus purified yeast with a portion of the green beverage, substantially completely saturating such mixture with $CO_2$, heating the carbonated mixture and subjecting it to high $CO_2$ pressure, then suddenly releasing the pressure and thereby causing the yeast cells to be ruptured, separating the $CO_2$ and water vapor from the liquid mass, fractionating said liquid mass into a liquid fraction and a substantially solid fraction, mixing the substantially solid fraction with about three times its weight of another portion of the green fermented beverage, then separating from the substantially solid fraction the last mentioned green beverage with enzymes which it extracted from that fraction, and then commingling the last mentioned green beverage and said liquid fraction with still another portion of the green beverage.

8. In a method of producing a fermented malt beverage, separating green fermented beverage from residue yeast, removing from said residue yeast, hop seeds, leaves, and other impurities which would tend to create turbidity and off taste in the finished beverage, mixing the thus purified yeast with a portion of the green beverage, substantially completely saturating such mixture with $CO_2$, while the mixture is at a pressure of about 100 pounds per square inch and a temperature slightly above 32° F., heating the carbonated mixture to a temperature of approximately 125° F. and subjecting it to a high $CO_2$ pressure between 1,000 and 3,000 pounds per square inch, then suddenly releasing the pressure and thereby causing the yeast cells to be ruptured, separating the $CO_2$ and water vapor from the liquid mass, separating a liquid fraction from the remainder of the liquid mass, and commingling said liquid fraction with another portion of the green beverage.

9. In a method of producing a fermented malt beverage, separating the green fermented beverage from residue yeast, removing from said residue yeast hop seeds, leaves, and other impurities which would tend to create turbidity and off taste in the finished beverage, mixing the thus purified yeast with a portion of the green beverage, substantially completely saturating such mixture with $CO_2$ at a temperature of approximately 32° F. while maintaining the mixture at a pressure of about 100 pounds per square inch, heating the carbonated mixture and subjecting it to high $CO_2$ pressure, then suddenly releasing the pressure to below atmospheric pressure and thereby causing the yeast cells to be ruptured, separating the $CO_2$ and the water vapor from the liquid mass, separating a liquid fraction from the remainder of the liquid mass, and commingling such liquid fraction with another portion of the green beverage.

MARVIN W. DITTO.
WILLIAM P. TORRINGTON.